(12) United States Patent
Hung

(10) Patent No.: US 9,930,740 B1
(45) Date of Patent: Mar. 27, 2018

(54) CONTROL CIRCUIT

(71) Applicant: CHAMP TECH OPTICAL (FOSHAN) CORPORATION, Foshan (CN)

(72) Inventor: Chin-Che Hung, Tu-Cheng (TW)

(73) Assignee: CHAMP TECH OPTICAL (FOSHAN) CORPORATION, Foshan (CN)

( * ) Notice: Subject to any disclaimer, the term of this patent is extended or adjusted under 35 U.S.C. 154(b) by 0 days.

(21) Appl. No.: 15/681,507

(22) Filed: Aug. 21, 2017

(30) Foreign Application Priority Data

Jul. 18, 2017 (CN) .......................... 2017 1 0586511

(51) Int. Cl.
*H05B 37/00* (2006.01)
*H05B 33/08* (2006.01)
(52) U.S. Cl.
CPC ..... *H05B 33/0833* (2013.01); *H05B 33/0881* (2013.01)
(58) Field of Classification Search
CPC ... H01K 9/04; H01K 1/62; H01K 1/18; H05B 41/295; H05B 41/46; H05B 37/036; H05B 39/105; H05B 33/0815; H05B 33/0818; H05B 41/2828; H05B 41/3921; H05B 41/3927; H05B 41/28; B60Q 1/0035; B60Q 11/00; B23K 9/1068
See application file for complete search history.

(56) References Cited

U.S. PATENT DOCUMENTS 9,060,403 B2 * 6/2015 Tseng ................. H05B 33/0845
2014/0247522 A1 * 9/2014 Simi .................. H05B 33/0884
361/18

* cited by examiner

*Primary Examiner* — Minh D A
(74) *Attorney, Agent, or Firm* — ScienBiziP, P.C.

(57) ABSTRACT

A control circuit of the present disclosure can directly coupled with AC power grid to control and adjust an LED lamp. The control circuit includes a protection unit, an anti-interference unit, an adjusting unit, an auxiliary control unit, a light emitting module, a low-flicker control unit, an ESD protection unit, an output unit and a plurality of IC unit. the adjusting unit adjusts and control a luminance of the light emitting module, the auxiliary control unit assistants to adjust the luminance of the light emitting module and increase a compatibility between the adjusting unit and the IC unit.

12 Claims, 1 Drawing Sheet

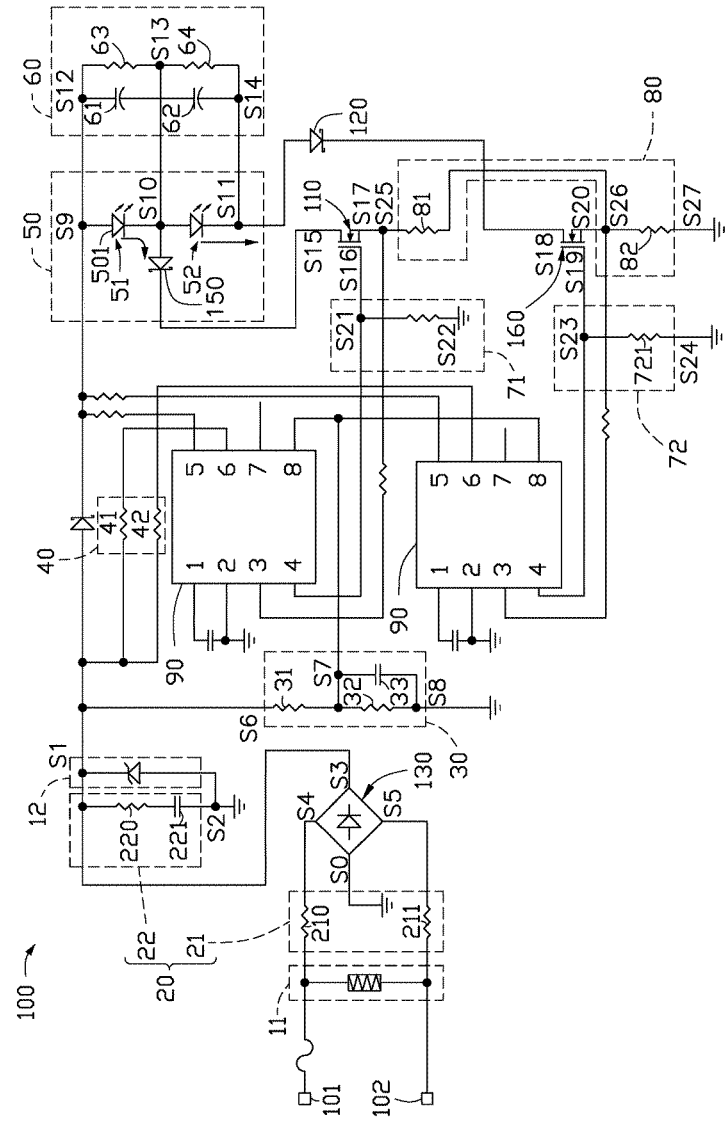

CONTROL CIRCUIT

CROSS-REFERENCE TO RELATED APPLICATIONS

This application claims priority to Chinese Patent Application No. 201710586511.X filed on Jul. 18, 2017, the contents of which are incorporated by reference herein.

FIELD

The subject matter herein generally relates to a circuit, especially related to a control circuit for controlling an LED lamp.

BACKGROUND

Light emitting diode (LED) lamp with energy saving, environmental protection, long life etc has widely occupied the main market position.

Generally, an LED lamp has a control circuit and a driving module therein to convert the alternating current (AC) to an adaptive current which the LED lamp needed. Thus, the control circuit and driving module has increased the price of the LED lamp. Further, the generally control circuit of LED lamp controls the LED lamp turn on or turn off. However, generally, the control circuit of LED lamps cannot adjust a light of the LED lamp or adjusts the light badly.

BRIEF DESCRIPTION OF THE DRAWINGS

Implementations of the present technology will now be described, by way of example only, with reference to the attached FIGURE.

The FIGURE is a diagram of a control circuit of the present disclosure.

DETAILED DESCRIPTION OF EMBODIMENTS

It will be appreciated that for simplicity and clarity of illustration, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. Also, the description is not to be considered as limiting the scope of the embodiments described herein. The drawings are not necessarily to scale and the proportions of certain parts have been exaggerated to better illustrate details and features of the present disclosure. The description is not to be considered as limiting the scope of the embodiments described herein.

Several definitions that apply throughout this disclosure will now be presented. The term "comprising" means "including, but not necessarily limited to"; it specifically indicates open-ended inclusion or membership in a so-described combination, group, series and the like. The term "coupled" is defined as connected, whether directly or indirectly through intervening components, and is not necessarily limited to physical connections. The connection can be such that the objects are permanently connected or releasably connected.

As illustrated in the FIGURE, a control circuit 100 of the present disclosure can directly coupled with an AC power grid to control and adjust an LED lamp. The control circuit 100 includes a protection unit 10, an anti-interference unit 20, an adjusting unit 30, an auxiliary control unit 40, a light emitting module 50, a low-flicker control unit 60, an ESD protection unit 70, an output unit 80 and a plurality of IC unit 90.

The control circuit 100 coupled with the AC power grid with a first end 101 and a second end 102. A fuse 103 is mounted between the first end 101 and the protection unit 10.

The protection unit 10 is used to prevent a surge from the AC power grid to stabilize voltage and current of the control circuit 100. The protection unit 10 includes a first protection unit 11 and a second protection unit 12.

Two end of the first protection unit 11 respectively couples with the first end 101 and the second end 102 of the control circuit 100. The first protection unit 11 is a steady state protection component. A performance of the first protection unit 11 for preventing the surge is better than a performance of the second protection 12 for preventing the surge. A response speed of the first protection unit 11 for the surge is more slowly than a response speed of the second protection unit 12 for the surge. In the illustrated embodiment, the first protection unit 11 is a metal oxide varistors (MOV).

The second protection unit 12 has a first connecting end S1 and a second connecting end S2. The first connecting end S1 of the second protecting unit 12 couples with a first connecting end S3 of an connecting unit 130. The second connecting end S2 of the second protection unit 12 couples with the ground. The second protection unit 12 is a transient protection component. A performance of the second protection unit 12 for preventing the surge is worse than a performance of the first protection unit 11 for preventing the surge. And a response speed of the second protection unit 12 for the surge is faster than a response speed of the first protection unit 11 for the surge. In the illustrated embodiment, the second protection unit 12 is a transient voltage suppressor.

The anti-interference unit 20 can prevent an electromagnetic waves and electromagnetic radiation from the AC power grid. The anti-interference unit 20 includes a first anti-interference 21 and a second anti-interference 22. The connecting unit 130 couples between the first anti-interference 21 and the second anti-interference 22. The connecting unit 130 has the first connecting S3, a second connecting end S4, a third connecting end S5, and a fourth connecting end S0.

Two ends of the first anti-interference 21 respectively couples with the second connecting S4 and the third connecting end S5 of the connecting unit 130. The first anti-interference 21 includes a first resistor 210 and a second resistor 211 connected parallelly with the first resistor 210. The second anti-interference 22 includes a third resistor 220 and a first capacitor 221 connected in series with the third resistor 220.

An end of the second anti-interference 22 couples with the first connecting end S3 of the connecting unit 130, and another end of the anti-interference 22 couples with ground.

The adjusting unit 30 adjusts a luminance of the light emitting module 50 to satisfy different lighting requirements. A first connecting end S6 of the adjusting unit 30 couples with the first connecting end S1 of the second protection unit 12. A second connecting end S7 of the adjusting unit 30 couples with the IC unit 90. A third connecting end S8 couples with ground.

Further, the adjusting unit 30 includes a fourth resistor 31, a fifth resistor 32 connected in series with the fourth resistor 31, a second capacitor 33 connected parallelly with the fifth resistor 32. An output current of the adjusting unit 30 enters the IC unit 90. In the illustrated embodiment, the adjusting unit is a triac Dimmer.

The auxiliary control unit 40 is used to increase a compatibility between the adjusting unit 30 and the IC unit 90. The auxiliary control unit 40 includes a sixth resistor 41, a seventh resistor 42 connected parallelly with the sixth resistor 41. The sixth resistor 41 and the seventh resistor 42 couples with the IC unit 90 and the first connecting end S1 of the second protection unit 12.

The light emitting module 50 includes a first light source 51 and a second light source 52 and a first backward diode 150. The first light source 51 and the second light source 52 respectively include a plurality of LEDs 501. A first connecting end S9 of the light emitting module 50 couples with the IC unit 90. A second connected end S10 of the light emitting module 50 couples with a first audion 110. A third connected end S11 couples with the input end of a second backward diode 120. The output end of the second backward diode 120 couples with a second audion 160.

An output current of the first light source 51 is through the first backward diode 150, the first audion 110 and enters the output unit 80. An output current of the second light source 52 is through the second audion 160 and enters the output unit 80. If the output current of the first light source 51 is described as $I_1$, the output current of the second light source 51 is described as $I_2$, an output current of the output unit 80 is described as I. Thus, I, $I_1$, $I_2$ satisfies the following relationship: $I=I_1+I_2$.

The low-flicker control unit 60 connects parallelly with the light emitting 50. A first connecting end S12 of the low-flicker control unit 60 couples with the first connecting end S9 of the light emitting module 50. A second connecting end S13 of the low-flicker control unit 60 couples with the second connecting end S10 of the light emitting module 50. A third connecting end S14 of the low-flicker control unit 60 couples with the input end of the second backward diode 120. The low-flicker control unit 60 can reduce a flicker frequency of the light emitting module 50 to protect eyesight of the person.

Specifically, the low-flicker control unit 60 includes a third capacitor 61, a fourth capacitor 62, an eighth resistor 63, and a ninth resistor 64. The eighth resistor 63 connects parallelly with the third capacitor 61. The ninth resistor 64 connects parallelly with the fourth capacitor 62. The eighth resistor 63 and the third capacitor 61 connects parallelly with the first light source 51. The fourth capacitor 61 and the ninth resistor 64 connects parallelly with the second light source 52. In the illustrated embodiment, the eighth resistor and the ninth resistor are discharge resistor, the third capacitor 61 and the fourth capacitor 62 are electrolytic capacitor.

The first audion 110 and the second audion 160 connects with the light emitting module 50, the low-flicker control unit 60, the ESD protection unit 70, the output unit 80 and the IC unit 90. The first audion 110 has a first connecting end S15, a second connecting end S16 and a third connecting end S17. The first connecting end S15 of the first audion 110 couples with the output end of the back ward diode 150. The second connecting end S16 of the first audion 110 couples with the ESD protection unit 70. The third connecting end S17 couples with the output unit 80 and the IC unit 90.

The second audion 160 has a first connecting end S18, a second connecting end S19, and a third connecting end S20. The first connecting end S18 of the second audion 160 couples with output end 120 of the second backward diode 120. The second connecting end S19 of the second audion 160 couples with the IC unit 90 and the ESD protection unit 70 and the IC unit 90. The third connecting end S20 couples with the output unit 80 and the IC unit 90.

The ESD protection unit 70 prevents the static electricity from the IC unit 90. The ESD protection unit 70 includes a first ESD protection unit 71 and a second ESD protection unit 72.

The first ESD protection unit 71 includes a tenth resistor 711. The second ESD protection unit 72 includes a eleventh resistor 721. A first connecting end S21 of the first ESD protection 71 couples with the second connecting end S16 of the first audion 110. A second connecting end S22 of the first ESD protection 71 couples with the ground. A first end of the second ESD protection unit 72 couples with the second connecting end S19 of the second audion 160 and the IC unit 90. A second connecting end S24 couples with the ground.

The output unit 80 includes a twelfth resistor 81 and a thirteenth resistor 82 connected in series with the twelfth resistor 81. A first connecting end S25 of the output unit 80 couples with the third connecting end S17 of the first audion 110 and the IC unit 90. A second connecting end S26 of the output unit 80 couples with the third connecting end S20 of the second audion 160 and the IC unit 90.

In the illustrated embodiment, a quantity of the IC unit 90 is two. Each of the IC unit 90 has eight connection port. The IC unit 90 couples with the components through the connection port.

In the illustrated embodiment, the second backward diode 120, the first backward diode 150 is used to prevent current of the control circuit 100 from reverse flow.

In the present disclosure, the control circuit 100 directly couples to the AC power grid. Thus, the LED lamp can leave out the drive to reduce volume and manufacturing cost of LED lamp. The adjusting unit 30 and the auxiliary control unit 40 together adjust the luminance of the LED lamp. The low-flicker control unit 60 reduces the flicker frequency of the light emitting module 50 to protect eyesight of the person.

The embodiments shown and described above are only examples. Many details are often found in the art such as the other features of a control circuit. Therefore, many such details are neither shown nor described. Even though numerous characteristics and advantages of the present technology have been set forth in the foregoing description, together with details of the structure and function of the present disclosure, the disclosure is illustrative only, and changes can be made in the detail, including in matters of shape, size and arrangement of the parts within the principles of the present disclosure up to, and including the full extent established by the broad general meaning of the terms used in the claims. It will therefore be appreciated that the embodiments described above can be modified within the scope of the claims.

What is claimed is:

1. A control circuit, coupled with AC power grid by a first end and a second end and drive LED lamp emitting light, the control circuit comprising:
   a protection unit;
   a light emitting module;
   a low-flicker control unit;
   an ESD protection unit;
   an output unit and a plurality of IC unit;
   wherein the control circuit further comprises a adjusting unit and a auxiliary control unit coupled with the adjusting unit, the adjusting unit couples with the protection unit and the IC unit, the auxiliary control unit couples with the protection unit and the IC unit, the adjusting unit adjusts and control a luminance of the light emitting module, the auxiliary control unit assists to adjust the luminance of the light emitting module and increase a compatibility between the adjusting unit and the IC unit.

2. The control unit of claim 1, wherein the protection unit is used to prevent a surge from an AC power grid to stabilize a voltage and current of the control circuit, the protection comprises a first protection unit and a second protection unit.

3. The control unit of claim 2, wherein a performance of the first protection unit for preventing the surge is better than a performance of the second protection for preventing the surge, a response speed of the first protection unit for the surge is more slowly than a response speed of the second protection unit for the surge.

4. The control circuit of claim 2, wherein the anti-interference unit prevents interference from electromagnetic waves and electromagnetic radiation from the AC power grid, the anti-interference unit comprises a first anti-interference and a second anti-interference coupled with the first anti-interference through a connecting unit.

5. The control circuit of claim 4, wherein the first anti-interference comprises a first resistor and a second resistor connected parallelly with the first resistor, the second anti-interference connects parallelly with the second protection, the second anti-interference comprises a third resistor and a first capacitor connected in series with the third resistor.

6. The control circuit of claim 1, wherein the adjusting unit comprises a fourth resistor, a fifth resistor connected in series with the fourth resistor, a second capacitor connected parallelly with the fifth resistor, the auxiliary control comprises a sixth resistor, a seventh resistor connected parallelly with the sixth resistor.

7. The control circuit of claim 1, wherein the light emitting module comprises a first light source and a second light source and a first backward diode 150, the first light source and the second light source respectively comprise a plurality of LEDs.

8. The control circuit of claim 7, wherein the low-flicker control unit connects parallelly with the light emitting module, the low-flicker control unit comprises a third capacitor, a fourth capacitor, an eighth resistor and a ninth resistor, the eighth resistor connects parallelly with the third capacitor, the ninth resistor connects parallelly with the fourth capacitor, the eighth resistor and the third capacitor connects parallelly with the first light source, the fourth capacitor and the ninth resistor connects parallelly with the second light source.

9. The control circuit of claim 1, wherein ESD protection unit prevents the static electricity from the IC unit, the ESD protection unit comprises a first ESD protection unit and a second ESD protection unit, the first ESD protection unit comprises a tenth resistor, the second ESD protection unit comprises a eleventh resistor.

10. The control circuit of claim 7, wherein an output current of the output unit is equal to a sum of an output current of the first light source and an output current of the second light source.

11. The control circuit of claim 1, wherein output unit comprises a twelfth resistor and a thirteenth resistor connected in series with the twelfth resistor.

12. The control circuit of claim 1, wherein further comprises a first audion and a second audion, the first audion and the second audion couples with the light emitting module, the low-flicker control unit, the ESD protection unit, the output unit and the IC unit.

\* \* \* \* \*